3,378,631
CONDUCTOR WITH SELF-DAMPING
CHARACTERISTICS
Aubrey Thomas Edwards, Oakville, Ontario, Canada, assignor to Aluminium Laboratories Limited, Montreal, Quebec, Canada, a corporation of Canada
Filed Dec. 30, 1966, Ser. No. 606,337
3 Claims. (Cl. 174—130)

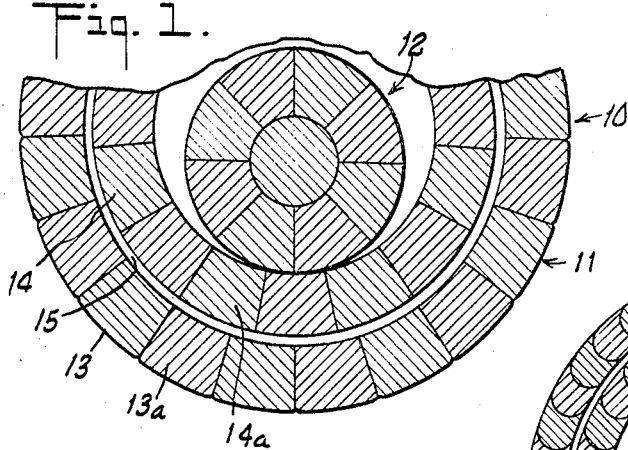
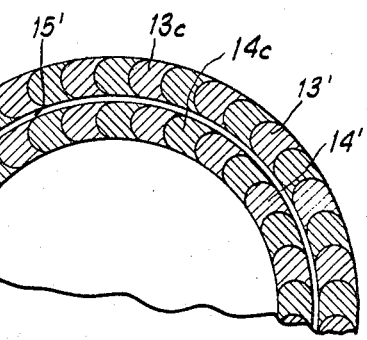
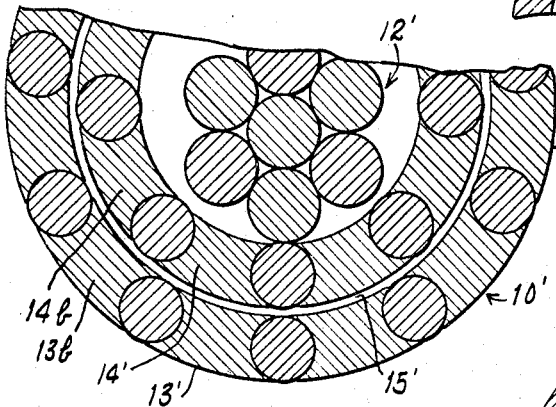
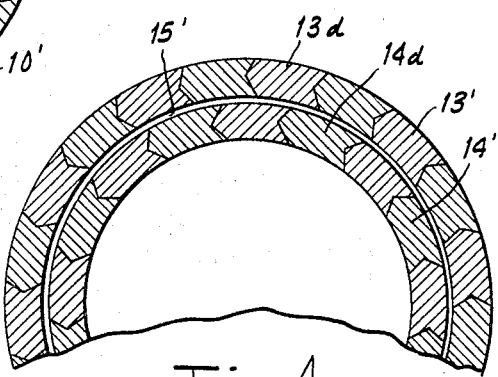
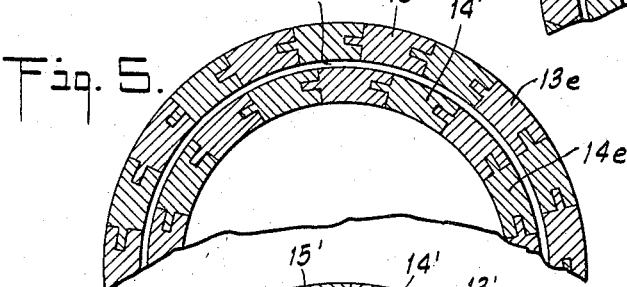
INVENTOR.
AUBREY THOMAS EDWARDS
BY Robert S. Dunham
ATTORNEY

United States Patent Office 3,378,631
Patented Apr. 16, 1968

ABSTRACT OF THE DISCLOSURE

A cable for use in an overhead transmission line, including a vibration self-damping sheath of conductor wires surrounding a core, the sheath having at least two spiral tubular layers of conductor wires with a gap therebetween when said layers are under service loads, the individual wires having cross-sections such that each layer maintains its shape under circumferential forces, and each layer being free of forceful radial contact.

---

By use herein of the term wire, is meant an elongated single strand of metal. These individual wires are stranded into cables for transmission of electrical energy. In this specification, such stranded wire cables will be described as conductors and the wires are thus conductor wires, although depending upon frequency and voltage, not all the wires in a cable will necessarily carry the same amount of current. Indeed, some wires are specifically intended to serve almost exclusively as tension or load-bearing members, while others serve almost exclusively as electricity conducting members. Nevertheless, all are conductors since they are capable of conducting electricity and in fact do all conduct some quantity under normal service conditions.

Transmission line conductors are prone to serious vibration problems. These vibration problems arise in two ways. When subjected to relatively low velocity winds, i.e. in the range 1–20 m.p.h., "aeolian vibration" occurs. Aeolian vibrations are of relatively low peak-to-peak amplitude (e.g. up to about the conductor diameter), and relatively high frequency (e.g. 2 to 200 cycles per second). When subjected to higher velocity winds, e.g. 15 to 30 miles per hour, and when certain other conditions such as icing of the conductors is present, a transmission line is sometimes subject to "galloping," that is to say, to vibrations having an amplitude ranging from a few inches to 20 or even 30 feet, and a frequency in the order of 0.25 cycle per second.

The present invention is concerned with damping these kinds of vibrations in multiple-wire conductors, so that the well known destructive tendencies of such vibrations are avoided, i.e. weakening of the supports for the line, fatigue of the conductor metal, overloading of the conductors, and the like.

In the usual prior art constructions, concentrically round wire conductors have very little if any self-damping properties. In such constructions the various layers bear against one another, that is to say, high radial forces are developed in the conductor between the wires in the radial direction. Very little self-damping is provided by such constructions under service conditions of the kind described above, and what little there may be results from the plastic deformation of the individual wires rather than from any inter-wire damping. Moreover, in the usual prior art constructions round cross-sectional wires are employed, and these tend to form point contacts between adjacent layers of wires, causing excessive wear. This is especially true when the adjacent layers are wound in opposite helical directions, but is also true when wound in the same helical direction.

The present invention recognizes that the aforesaid wear occurs not only because of the aforesaid point contacts but also because there are vibrations of sufficient duration and amplitude to produce such wear at the point contacts in the first instance. The present invention provides a self-damping means which reduces the vibrations of the conductor, and thereby reduces the aforesaid wear, as well as reducing all the other problems associated with excessive vibrations, e.g. stress and wear at the mountings of the transmission line.

It is an object of the present invention to provide a multi-wire conductor construction useful for overhead transmission lines wherein wear between the wires is markedly reduced and/or wherein the damping of vibrations of the conductor is markedly increased.

Another object of the invention is to provide such a conductor construction which is capable of superior service under various overhead transmission line service conditions.

Another object of the invention is to provide such a conductor construction which is capable of long life in overhead transmission line use by reducing the amplitude of wind induced vibrations, and by drastically reducing the wear resulting from vibrations.

Another object of the invention is to provide a multi-wire conductor construction useful for overhead transmission lines and combining efficient damping of vibrations with markedly reduced conductor wear due to clashing and rubbing of conductor wires in a loose core construction.

These and other objects and advantages of the invention will be more fully understood as a detailed description of presently preferred embodiments of the invention are set forth hereinafter, with reference to the appended drawings, in which:

FIG. 1 is a section view through a conductor showing the construction of a first embodiment of a multiwire sheath according to the invention, and showing a loose multi-wire core having a smooth outer surface;

FIG. 2 is a section view through a conductor showing the construction of a second embodiment of a multi-wire sheath according to the invention, and showing a loose multi-wire core having an undulated outer surface;

FIG. 3 is a section view of a sector of a third embodiment of a multi-wire sheath constructed in accordance with the principles of the present invention; and FIGS. 4, 5, and 6 are section views similar to FIG. 3 showing the 4th, 5th, and 6th embodiments according to the invention.

Briefly, the invention provides, in a conductor having at least two spirally wrapped conductor wire layers, the improvement wherein at least one of those layers is characterized by the individual wires therein being in continuous contact circumferentially around that layer along large areas of mutual contact, and by that layer being out of forceful contact with other wires of said conductor so that radial forces thereon resulting from axial conductor tensions (e.g., service loads) are eliminated or radially reduced. The resultant large circumferential forces developed within that layer, acting over large areas of contact between the wires of that layer, give a much improved degree of self-damping to the conductor. More than one layer can be so arranged, as will appear hereinbelow.

Referring now to the figures, in FIG. 1 there is shown a first embodiment of the inventive principles, wherein a conductor indicated generally at 10 comprises a sheath indicated generally at 11 and a loose inner core indicated generally at 12. The sheath is comprised of two layers 13 and 14. Each of layers 13 and 14 is comprised of a plurality of conductors 13a, 14a respectively. It is essential that the wires each have a cross-section adapted to provide stable contact with the wires on either side thereof within the same layer under circumferential forces. That is, the general shape of the layer must be stable under circumferential forces, and in the first embodiment of FIG. 1 the wires 13a, 14a are shown to be essentially truncated sectors, so as to provide the aforesaid stability.

Between the pair of layers 13, 14 there is an annular gap indicated at 15. The layers 13, 14 and their individual wires 13a, 14a are dimensioned so that gap 15 between layers 13, 14 is maintained when the conductor 10 is subjected to the normal service conditions, i.e., to the normal amount of tension produced by the weight of the conductor itself and its external loads when suspended between points in service, and this condition is illustrated in FIG. 1. This occurs because tension upon the spiral-wrapped layers forces the individual wires 13a in layer 13 against one another circumferentially, and forces the individual wires 14a in layer 14 against one another circumferentially, thus determining the circumferential geometry of both layers and defining the gap 15.

The conductor 10, in embodying the principles of the invention, can take many forms. It is only essential that at least one of the layers, in a conductor having at least two spirally-wrapped layers, be free from radial forces. For example, when conductor 10 comprises a sheath 11 and a core 12, as illustrated, layers 13 and 14 can be provided with gap 15 therebetween, as aforesaid. Since layer 13 is the outermost sheath layer, and layer 14 is the innermost sheath layer, the provision of gap 15 renders both of layers 13 and 14 free from radial forces. If further layers were wrapped upon layer 13, in radial contact therewith, then only layer 14 would continue to be free from radial forces in accordance with the invention. If however such additional layers were spaced from layer 13 by a gap similar to gap 15, then both layers 13 and 14 would continue to function in accordance with the invention. The same possibilities exist with regard to layers placed inwardly of layer 14. Thus, sheath 11 can have any convenient number of layers, and any number thereof can be free from radial forces in accordance with the invention by provision of gaps such as 15, or some can be so arranged while others are normally arranged, i.e., are wrapped in contact so as to give rise to radial forces.

When a sheath and core are employed, as illustrated, the core can be tight within the sheath, i.e., can be in radial contact therewith, provided that at least one sheath layer remains free from radial forces in accordance with the invention. For example, in FIG. 1 if core 12 were tight within sheath layer 14, sheath layer 13 would still be free from radial forces, and the invention would still be practiced. It is preferred however, to maintain at least a gap such as 15 between the sheath 11 and the core 12, so that an additional layer such as 14 can be free of radial forces. In addition, core 12 may be a loose core, i.e., a substantial gap may exist between core 12 and sheath 11, as illustrated. Normally core 12 is of a hard material of high tensile strength, e.g., steel, while sheath 11 is of a softer material of high conductivity, e.g., conductor alloy aluminum. In this case, the core 12 may be viewed as a core even when it is tightly enclosed within sheath 11. However, all the wires of conductor 10 may also be of one kind of material, e.g., aluminum, and in that case there may be no core 12, strictly speaking, but rather a succession of layers with at least one layer free from radial forces from its adjacent layers.

In any case, under service tension, the spirally-wrapped layers will create substantial radial forces upon any adjacent layers with which they are in contact, but those layers that are free from radial forces will instead develop circumferential forces, which forces are far more efficient in damping conductor vibratory motion by interwire friction. Except for the innermost and outermost sheath layers, every layer that is free of radial forces will be bounded by a gap such as 15 at the inner periphery thereof and at the outer periphery thereof. In the special case of an inner or outer layer, e.g., layer 13 or 14, only a single gap 15 is required because the free boundary of the sheath 11 exists on the other periphery of such a layer.

To achieve gaps 15, the individual wires, e.g., wires 13a of layer 13, are dimensioned in such a way that a certain fixed inner and outer diameter exists in that layer when the layer wires are in circumferential contact, i.e., when service loads on the spiral layer press the individual wires 13a against one another around layer 13. With regard to adjacent layers such as 13, 14, the inner diameter of layer 13 and the outer diameter of layer 14 is thus determined, so that a gap 15 may be defined therebetween.

It will be understood of course, that when energy is dissipated by the wires in each layer in the aforesaid manner the amplitude of vibration will be greatly attenuated, and this self-damping will greatly reduce wear. This self-damping can be practiced by construction of a sheath in accordance with the invention as is illustrated in FIG. 1, or as aforesaid, by construction of the entire conductor with such layers, or by numerous other arrangements following the inventive principles.

In FIG. 2 there is shown a conductor indicated generally at 10' comprising a two layer sheath indicated generally at 11', and a core indicated generally at 12'. The principles of operation in this embodiment are the same as those already described with relation to the first embodiment. This embodiment is intended to illustrate another form of individual wires 13b, 14b suitable for use with the invention. In this embodiment, each of layers 13', 14' comprises alternate round section wires and scalloped section wires, the alternate arrangement giving a circumferential locking effect and yet employing a quantity of round section wires for economy and convenience. The overall effect is the same because the wires in each of layers 13, 14 are pressed circumferentially under load to define the interlayer gap 15' which gives the advantages already described.

In FIGS. 3 through 6 there are shown the third through sixth embodiments of the invention, wherein in each instance the wires 13c, 14c through 13f, 14f are provided with various cross-sections which, although not truncated sectors as in the first embodiment, provide circumferential locking under circumferential forces so that the integrity of each layer under tension is preserved and thereby the gap is maintained between the layers. In all of these embodiments as in the first embodiment, a core of various designs may be employed which may be a conventional or a loose core, or the entire conductor may consist of such layers.

While it is preferred that each layer have the same composition in terms of the cross-section of wires contained therein, this is not necessary to the invention and it is possible to mix layers from the various embodiments. An outer layer of round or other cross-section wires may be used on the outside of the outer layer, i.e. in the figures on the outside of layer 13 in FIG. 1 or the corresponding layer in the other figures, to protect the illustrated layers from the effects of weathering. Layer 13 will then continue to practice the invention if this additional protective layer is separated therefrom by a gap such as 15. If no such gap is provided, then only layer 14 (in the illustrated two layer embodiment) will practice the invention.

It is not critical what shape cross-section the individual wires have, although truncated sectors, as in FIG. 1, are preferred. However, since circumferential forces must be tolerated with maintenance of the geometric integrity of the layer, e.g. maintenance of its circularity, some stability must exist between adjacent wires in a layer. All the forms of layers shown include such stability against deformation of the layer under circumferential forces, but of course other wire cross-sections exist that can accomplish the same, and such are contemplated as being within the practice of the invention when employed as taught herein.

While the invention has been described with reference to certain specific embodiments, variations therein are of course contemplated, since the embodiments are illustrative only, and are in no way limiting.

What is claimed is:
1. In a vibration self-damping cable for use in an overhead suspended transmission line for electrical energy, wherein a central core portion is surrounded by a conductor portion, the vibration self-damping improvement in the conductor portion comprising:
   (a) a first tubular layer of conductor wires wound in a spiral direction, the individual wires in said layer each having a cross-section adapted to provide stable contact with the wires on either side side thereof within said first layer when said first layer is subjected to circumferential forces, to maintain the shape of said first tubular layer under said circumferential forces, said layer having a certain fixed inner diameter when all the wires thereof are in side-by-side contact with each other around the circumference thereof; and
   (b) a second tubular layer of conductor wires disposed within said first layer and also wound in a spiral direction, the individual wires in said layer each having a cross-section adapted to provide stable contact with the wires on either side thereof within the said layer when said layer is subjected to circumferential forces, to maintain the shape of said second tubular layer under said circumferential forces, said second layer having a certain fixed outer diameter when all the wires thereof are in side-by-side contact with each other around the circumference thereof, said second tubular layer certain fixed outer diameter being less than said first tubular layer certain fixed inner diameter so that an annular gap is defined between said layers when said layers are each subjected to said circumferential forces,
each of said first and second tubular layers also being free of radial pressure on the side thereof opposite to the side facing the other.

2. A conductor according to claim 1, wherein said wires in said first tubular layer and said wires in said second tubular layer are substantially truncated sectors in cross-section.

3. A conductor according to claim 1, wherein the inner surface of said first tubular layer of wires and the outer surface of said second tubular layer of wires are each relatively smooth and circular in outline.

References Cited
UNITED STATES PATENTS

| | | | |
|---|---|---|---|
| 1,692,529 | 11/1928 | Zagorski | 174—130 X |
| 1,904,116 | 4/1933 | Baum | 174—38 |
| 2,087,876 | 7/1937 | Peterson | 174—130 X |

FOREIGN PATENTS

| | | |
|---|---|---|
| 22,886 | 10/1930 | Australia. |
| 771,623 | 7/1934 | France. |
| 800,635 | 5/1936 | France. |
| 670,362 | 1/1939 | Germany. |
| 691,629 | 6/1940 | Germany. |
| 902,744 | 1/1954 | Germany. |

LARAMIE E. ASKIN, *Primary Examiner.*